(12) United States Patent
Mauger et al.

(10) Patent No.: US 11,999,573 B2
(45) Date of Patent: Jun. 4, 2024

(54) SANITARY SPIRAL CONVEYOR

(71) Applicant: NCC Automated Systems, Inc., Souderton, PA (US)

(72) Inventors: Kevin Mauger, Lower Gwynedd, PA (US); Ron Schwar, Walnutport, PA (US); Kyle LaPointe, Decatur, GA (US); Michael Ferraro, Harleysville, PA (US); Robert Nettleton, Glenside, PA (US); Martin Zona, Gillertsville, PA (US)

(73) Assignee: NCC AUTOMATED SYSTEMS, INC., Souderton, PA (US)

( * ) Notice: Subject to any disclaimer, the term of this patent is extended or adjusted under 35 U.S.C. 154(b) by 0 days.

(21) Appl. No.: 17/857,850

(22) Filed: Jul. 5, 2022

(65) Prior Publication Data

US 2023/0002165 A1    Jan. 5, 2023

Related U.S. Application Data

(60) Provisional application No. 63/217,965, filed on Jul. 2, 2021.

(51) Int. Cl.
*B65G 21/18* (2006.01)

(52) U.S. Cl.
CPC ...... *B65G 21/18* (2013.01); *B65G 2201/0202* (2013.01); *B65G 2207/24* (2013.01); *B65G 2207/26* (2013.01); *B65G 2207/44* (2013.01); *B65G 2812/02019* (2013.01); *B65G 2812/02138* (2013.01); *B65G 2812/0324* (2013.01)

(58) Field of Classification Search
CPC ............ B65G 21/18; B65G 2201/0202; B65G 2207/24; B65G 2207/26; B65G 2207/44; B65G 2812/02019; B65G 2812/0324
USPC ........................................................ 198/778
See application file for complete search history.

(56) References Cited

U.S. PATENT DOCUMENTS

| | | | | |
|---|---|---|---|---|
| 3,826,352 A | * | 7/1974 | Van Zon | B65G 21/18 198/778 |
| 3,857,476 A | * | 12/1974 | Heifetz | B65G 21/18 198/778 |
| 3,904,025 A | * | 9/1975 | Garvey | B65G 21/18 198/778 |
| 4,850,475 A | * | 7/1989 | Lupo | B65G 21/18 198/833 |
| 8,302,765 B2 | * | 11/2012 | Lago | B65G 17/086 198/848 |
| 9,540,176 B2 | * | 1/2017 | Matsuzaki | B65G 23/06 |
| 2006/0070860 A1 | * | 4/2006 | Huang | B65G 17/086 198/852 |

FOREIGN PATENT DOCUMENTS

| | | |
|---|---|---|
| GB | 2056400 A | 3/1981 |
| WO | 2013128246 A1 | 9/2013 |

\* cited by examiner

*Primary Examiner* — Gene O Crawford
*Assistant Examiner* — Keith R Campbell
(74) *Attorney, Agent, or Firm* — Volpe Koenig

(57) ABSTRACT

A spiral conveyor is described. The spiral conveyor provides an open design. The open design creates and defines a sanitary design. The combination of a cantilever frame construction (with no side frames) and the edge/side driven belting allows for access and cleanability of the spiral conveyor.

10 Claims, 6 Drawing Sheets

300

SANITARY SPIRAL CONVEYOR

FIELD OF INVENTION

The present invention is directed to conveyors and conveying systems, and more particularly to spiral conveyors and spiral conveying systems with an open configuration to provide a sanitary design.

BACKGROUND

The industry has a variety of existing spiral solutions with frame and drive designs that allow similar belt path configurations. These existing solutions fail to combine technologies allowing for an ultra-hygienic spiral. With the rising importance of food safety, including the proliferation of the Food Safety Modernization Act, food manufacturers need a more hygienic solution to allow a more thorough cleaning of spiral conveyor solutions. Currently, the existing solutions either have sideframes on the outside of the conveyor, preventing access for cleaning, or large inner drums, the insides of which are near impossible to clean.

SUMMARY

A spiral conveyor is described. The spiral conveyor provides an extremely open design. The open design creates and defines a very sanitary design. The combination of a cantilever frame construction (with no side frames) and the edge/side driven belting allows for superior access and cleanability. This access and cleanability are of paramount importance to the food market, where sanitation requirements are stringent to maintain food safety by preventing bacteria growth.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

The present system and method is directed to a spiral conveyor that is extremely open, which creates a very sanitary design. The combination of the cantilever frame construction (with no side frames) and the edge/side driven belting allows for superior access and cleanability, which is of paramount importance to the food market, where sanitation requirements are stringent to improve food safety, prevent growth of bacteria and ensure food safety.

Figure 1:
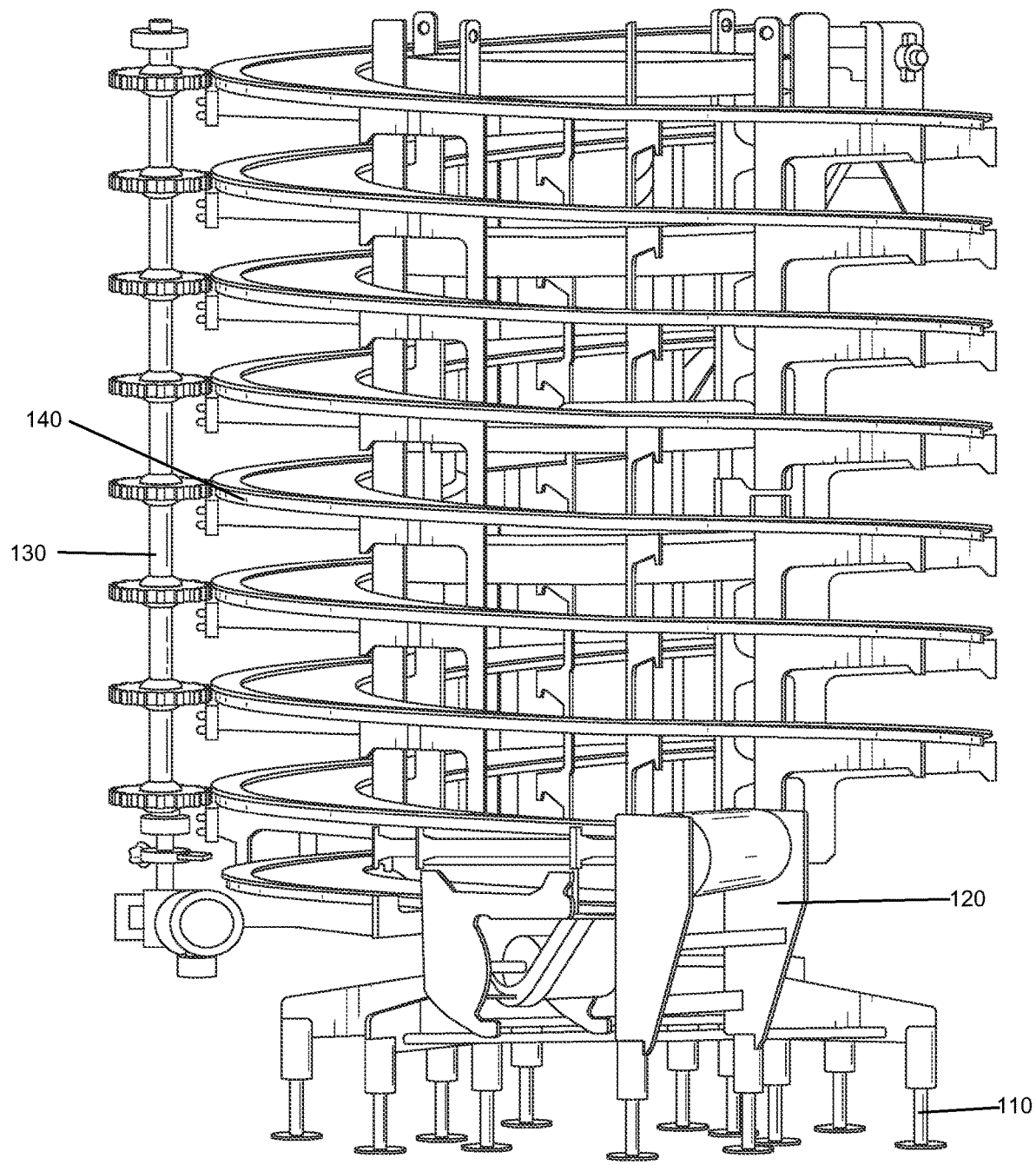
FIG. 1 illustrates a spiral conveyor with an open configuration to provide a sanitary design.

FIG. 1 illustrates a spiral conveyor 100 with an open configuration to provide a sanitary design. Spiral conveyors include advantages including a small operating footprint, high throughput, and, many times, a single drive. The small operating footprint may provide space savings. The spiral conveyors convey the load in a continuous flow, creating high throughput. Driving the belt from the side allows the belt tension to be equally distributed through the length of the belt instead of at the end. This style of driving and distribution of the tension allows longer belting runs. Further, spiral conveyors provide ease of installation and can be installed as a single piece that is pre-assembled and tested. Spiral conveyors can also be used as a process step in an operation to allow for curing, cooling, or other time-based processes that are required in between either process or packaging steps in the production line.

The spiral conveyor 100 includes legs 110 supporting a cantilever frame 120 construction with an edge/side drive 130 of belting 140. In operation, the spiral conveyor 100 is supported by legs 110 resting on an operating space, such as a floor, for example. The legs 110 support the frame 120 in a rigid manner. The legs may be made from stainless steel, for example. The frame may be made from stainless steel, for example. The frame provide the structure through which the side drive 130 operates. As illustrated, the side drive 130 may run vertically along the length of the conveyor 100. The side drive may access the belting 140 at a circumferential point by providing contact at each circumferential point on the conveyor 100. Alternative configurations, such as every other point and the like also may be used. The side drives may be placed as tension in belting 140 demands. This may include every layer, every other layer, and on long running conveyors anywhere, or multiple places, along the length of the conveyor. As would be understood in the art, the belt 140 provides the surface for the conveyor 100 to convey items or products.

Figure 2:
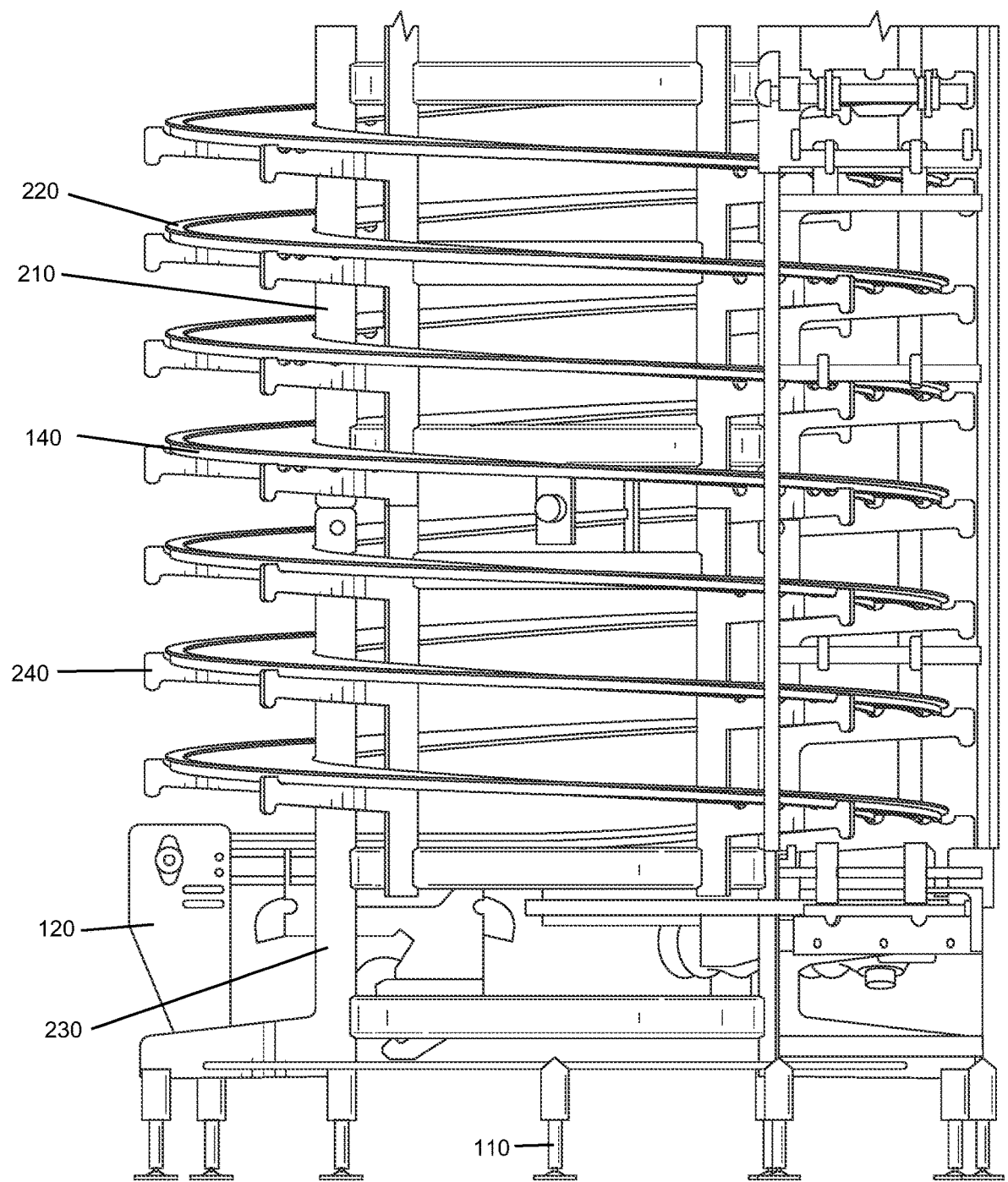
FIG. 2 illustrates the primary frame and plastic wearstrip (carryway) of the spiral conveyor of FIG. 1.

FIG. 2 illustrates the primary frame 210 and plastic wearstrip (carryway) 220 of the spiral conveyor 100 of FIG. 1. This sanitary/hygienic design has an extremely open style of frame construction that allows for superior access for washdown cycles. The primary frame 210 is illustrated. The primary frame 210 is distinct from other spiral conveyors presently in the market. These other spiral conveyors typically have a drum or cage on the inside of the spiral. Further, the other spiral conveyors fail to have an open cantilevered design. The keys to this open design are two things which include a frame 210 that carries belting 140 of a cantilever style with center vertical supports 230 and an edge driven belt 140 to eliminate the center drum/cage of other designs.

Figure 3:
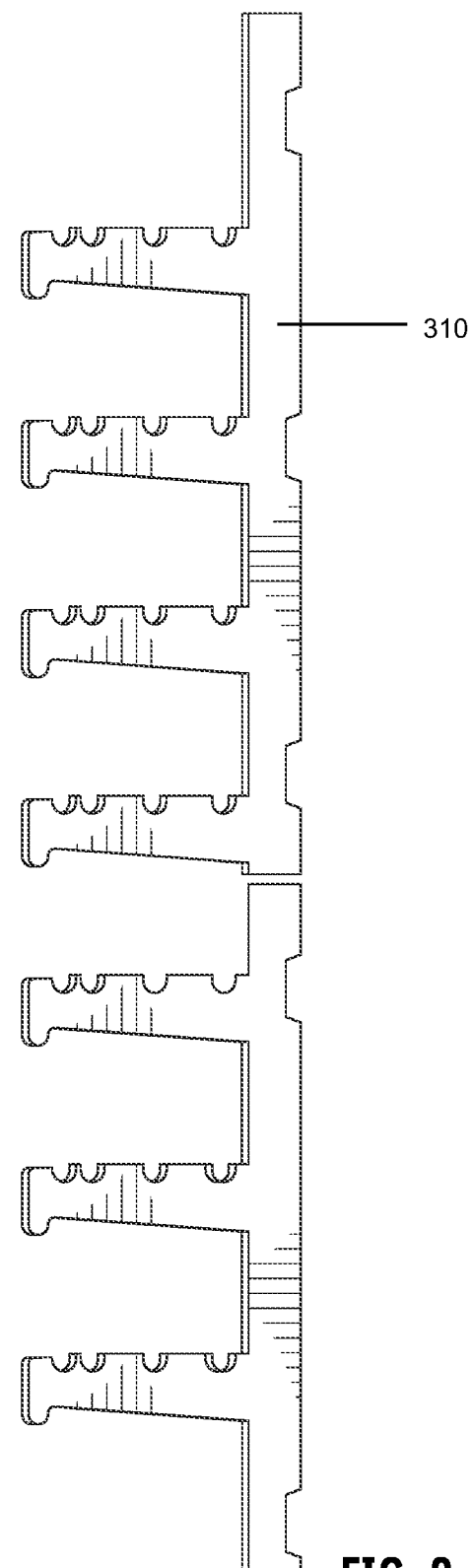
FIG. 3 illustrates the vertical frame member that holds the carryway and supports the belting in the spiral conveyor of FIG. 1.

FIG. 3 illustrates the vertical frame member 310 that holds the carryway 220 and supports the belting in the spiral conveyor 100 of FIG. 1. The vertical frame member 310 is at least a portion of primary frame 210 of FIG. 2. The frame 210 that carries the modular plastic belting is a cantilever style with a center vertical support 230 and horizontal belt supporting members that are cantilevered. This allows the cantilever frame 210 to be supported from one side. This frame 210 is constructed of stainless-steel plate, laser or waterjet cut to the application. The frame 210 is welded to other members to form the complete structure 100.

Figure 4:
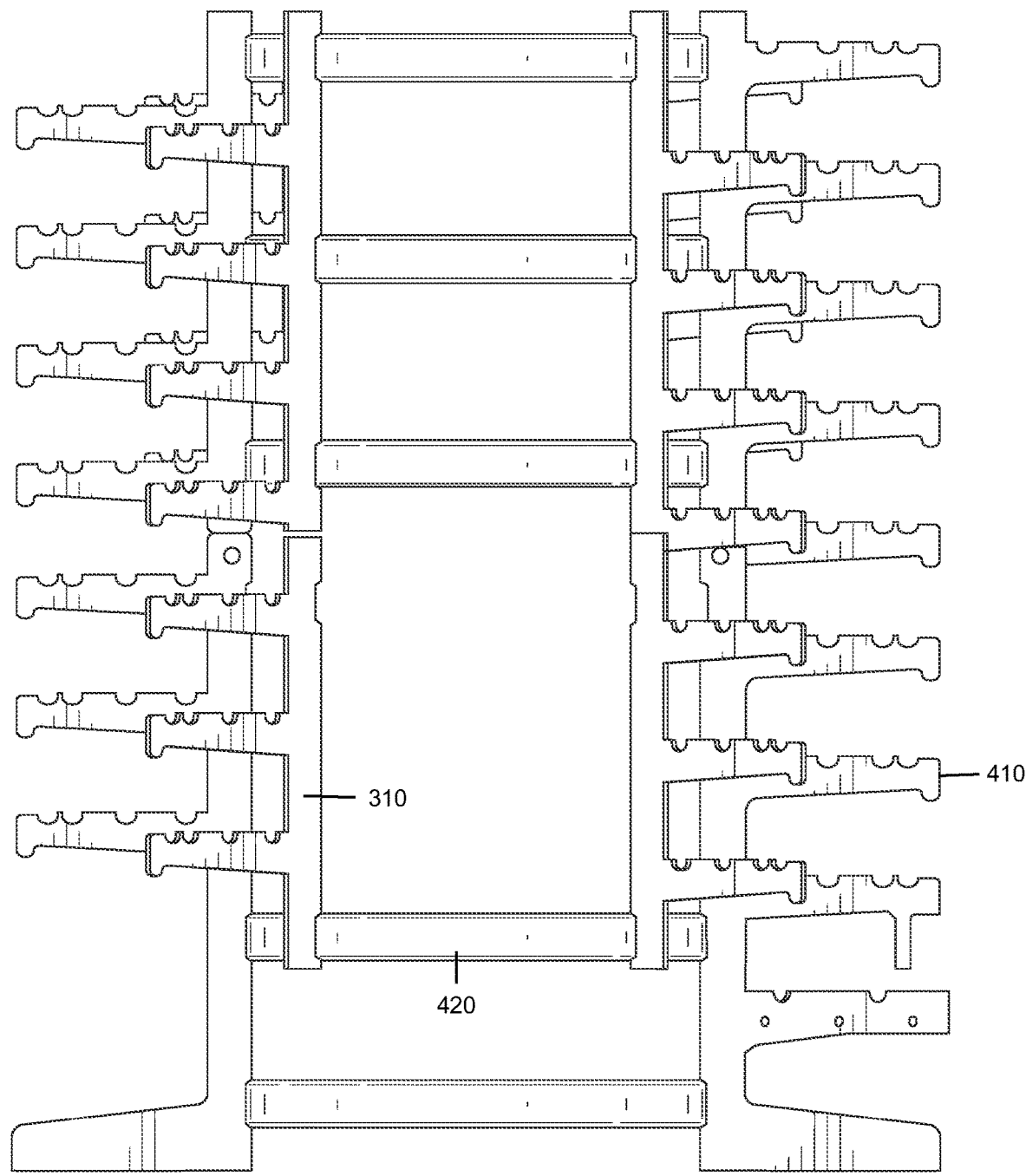
FIG. 4 illustrates the overall structure of the spiral conveyor of FIG. 1 absent any plastic or belting.

FIG. 4 illustrates a representative overall structure 400 (shown as 210 in FIG. 2) of the spiral conveyor 100 of FIG. 1 absent any plastic or belting. These vertical frame members 310 are welded to each other by means of center ring supports 420 that create the overall primary structure 400. The fact that the there are no sideframes on the outside of the structure allows good visibility and cleaning access. The fact that the inside is open without a center structure allows for great access and cleanability. The vertical frame members 410 are equivalent to the vertical frame members 310 in FIG. 3.

Figure 5:
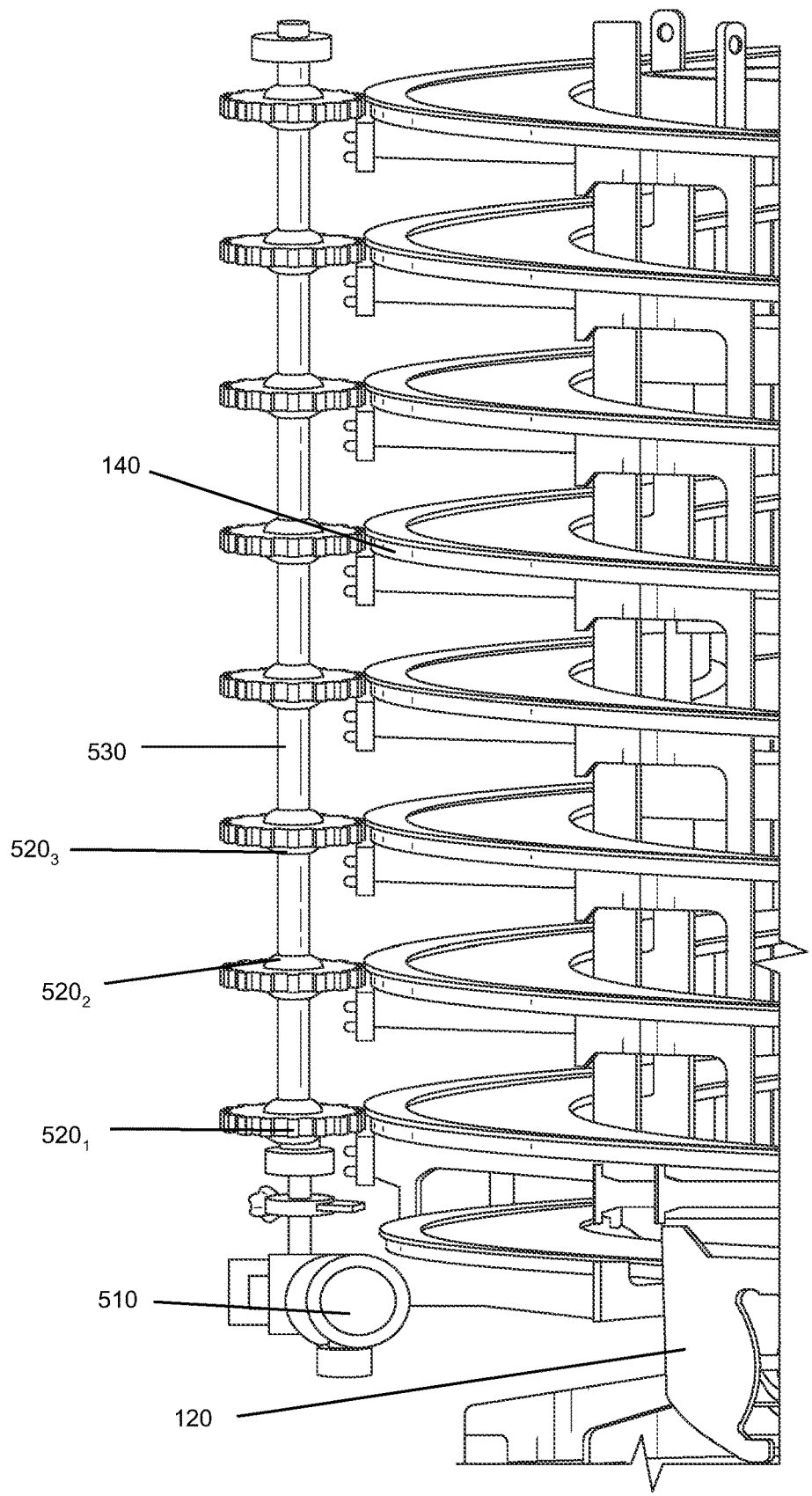
FIG. 5 illustrates the edge drive of the spiral conveyor of FIG. 1.

FIG. 5 illustrates the edge drive 500 (illustrated as 130 in FIG. 1) of the spiral conveyor 100 of FIG. 1. An edge/side drive 130 is used to drive belt 140 allowing for the elimination of a driven, center drum/cage. By eliminating the center drum/cage the center remains open. With this open design, comes improved access and cleanability. A motor/gearbox combination 510 turns a vertical shaft 530 which has multiple plastic sprockets 520, identified as $520_1$, $520_2$, $520_3$, . . . , on that common shaft 530. The multiple plastic sprockets 520 allow the belt 140 to be driven at multiple locations, reducing tension build up as the belt rides up the conveyor. The common shaft 530 are equivalent to the edge/side drive 130.

Figure 6:
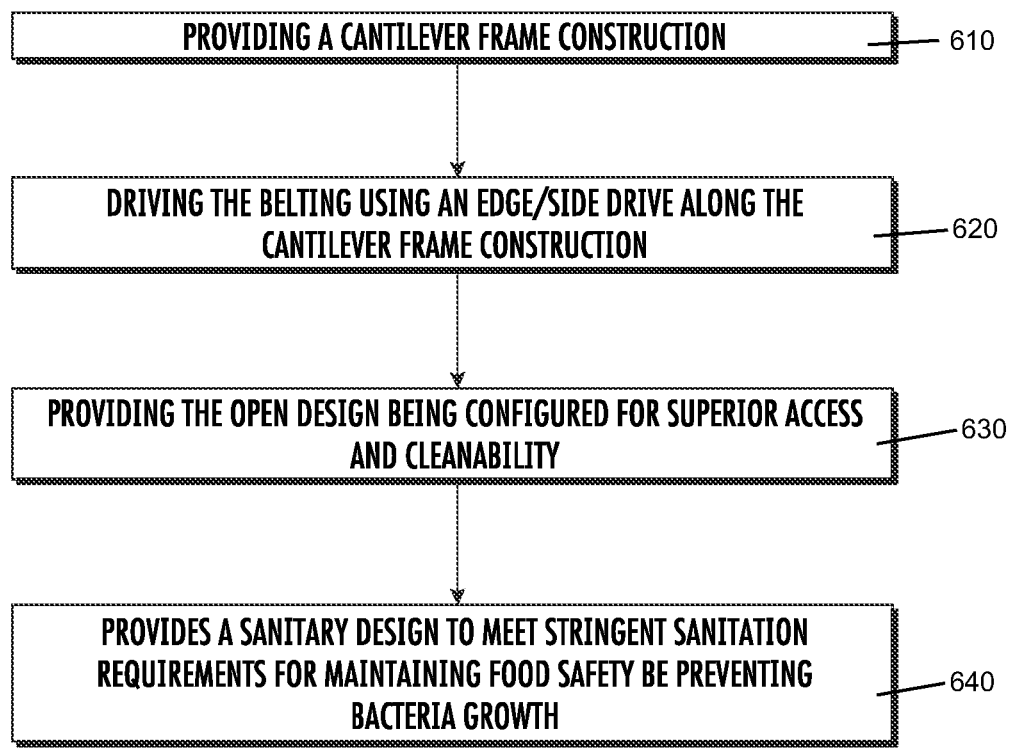
FIG. 6 illustrates a method of providing a spiral conveyor with an open configuration to provide a sanitary design.

FIG. 6 illustrates a method 600 of providing a spiral conveyor (illustrated as conveyor 100 of FIG. 100, for example) with an open configuration to provide a sanitary design. This method 600 includes providing, at step 610, a cantilever frame construction. The method 600 includes driving, at step 620, the belting using an edge/side drive along the cantilever frame construction. The cantilever frame with the edge/side driven belting providing the open design being configured for superior access and cleanability. The method 600 provides, at step 630, an open design that creates and defines a sanitary design. The edge/side driven belting does not include side frames. The spiral conveyor is used in the food market. The method 600 provides a sanitary design to meet stringent sanitation requirements for maintaining food safety by preventing bacteria growth at step 640.

The combination of the cantilever frame construction (with no side frames) and the edge/side driven belting allows for superior access and cleanability, which is of paramount importance to the food market, where sanitation requirements are stringent to improve food safety, prevent growth of bacteria and ensure food safety.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A system for a spiral conveyor with an open design, the system comprising:
    a cantilever frame construction allowing for a conveyor without side frames outside the conveyor;
    an edge/side driven belting conveying along the cantilever frame construction,
    wherein the cantilever frame with the edge/side driven belting providing the open design configured to provide for access that enables cleaning of the spiral conveyor.

2. The system of claim 1 wherein the open design with the cantilever frame without side frames further enhances access for cleaning.

3. The system of claim 1 wherein the edge/side driven belting does not include side frames.

4. The system of claim 1 wherein the spiral conveyor is used in a food market.

5. The system of claim 1 wherein the system provides an open design capable of meeting sanitation requirements for maintaining food safety.

6. A method for a spiral conveyor with an open design, the method comprising:
    providing a cantilever frame construction allowing for a conveyor without side frames outside the conveyor;
    conveying along the cantilever frame construction via an edge/side driven belting,
    wherein the cantilever frame with the edge/side driven belting providing the open design configured to provide for access that enables cleaning of the conveyor.

7. The method of claim 6 wherein the open design with the cantilever frame with side frames further enhances access for cleaning.

8. The method of claim 6 wherein the edge/side driven belting does not include side frames.

9. The method of claim 6 wherein the spiral conveyor is used in a food market.

10. The method of claim 6 further comprising providing an open design capable of meeting sanitation requirements for maintaining food safety.

\* \* \* \* \*